(12) United States Patent
Prince

(10) Patent No.: US 6,509,866 B2
(45) Date of Patent: Jan. 21, 2003

(54) FAST CHIRP TRANSFORM

(75) Inventor: Thomas A. Prince, South Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/759,757

(22) Filed: Jan. 12, 2001

(65) Prior Publication Data

US 2002/0035438 A1 Mar. 21, 2002

Related U.S. Application Data

(60) Provisional application No. 60/175,769, filed on Jan. 12, 2000.

(51) Int. Cl.[7] .............................. G01S 13/00; G01B 9/02
(52) U.S. Cl. ....................... 342/196; 342/175; 342/195; 708/400; 708/403; 708/404; 708/405; 356/28; 356/28.5; 356/450; 356/477
(58) Field of Search ................................. 342/128–132, 342/175, 192–197, 202–204; 708/400–410, 490, 620, 622, 1, 3, 5, 8; 356/4.01, 4.09, 4.1, 27, 28, 28.5, 35.5, 450, 451–456, 477–483, 505, 506, 900–903; 375/139; 327/551, 552

(56) References Cited

U.S. PATENT DOCUMENTS

| | | | | |
|---|---|---|---|---|
| 3,925,648 A | * | 12/1975 | Speiser et al. | 708/5 |
| 3,965,343 A | * | 6/1976 | Speiser et al. | 708/405 |
| 4,282,579 A | * | 8/1981 | Speiser et al. | 708/405 |
| 5,388,121 A | * | 2/1995 | Skudera, Jr. | 375/139 |
| 5,424,674 A | * | 6/1995 | Skudera, Jr. et al. | 327/552 |
| 5,841,395 A | * | 11/1998 | Simone | 342/196 |

OTHER PUBLICATIONS

S. Anderson et al., "Proposal to the LSC for a Prototype Implementation of a Binary Inspiral Search Based on the Fast Chirp Transform", LIGO–G000217–00–D; Sep. 5, 2000.*

"The Fast Chirp Transform Home Page"; posted on the Internet at www.sri.caltech.edu/fct; no author listed; copyright date is the year 2000.*

Scientific Program of the 4th Edoardo Amaldi Conference on Gravitational Waves (Perth, Australia); no author listed; Conference was held from Jul. 8 to 13 of the year 2001; listed on Internet at www.gravity.uwa.edu.au/amaldi/sciprog.htm.*

List of Publications of Dr. Thomas A. Prince; no author listed; no date listed; posted on the Internet at www.cost.caltech.edu/~prince/pub__html.html.*

Allen, B., *Grasp: A Data Analysis Package for Gravitational Wave Detection*; 1999 http://www.lsc–group.phys.u-wm.edu/~ballen/grasp–distribution, v1.9.8 ed., pp. 1–29.

(List continued on next page.)

*Primary Examiner*—Bernarr E. Gregory
(74) *Attorney, Agent, or Firm*—Christie, Parker & Hale, LLP

(57) ABSTRACT

A Fast Chirp Transform (FCT) for the digital processing of chirp signals and exemplary applications. The FCT is a generalization of a multidimensional Fast Fourier Transform. Phase coefficients for boundary intervals are calculated using phase functions describing the time dependent frequency characteristics of an input signal in the time domain. A multidimensional FFT is performed on the dot product of the phase coefficients and the input signal resulting in a multidimensional representation of the input signal in the frequency domain. The FCT and its inverse can be used to enhance the signal to noise ratio in applications involving chirp signals.

21 Claims, 14 Drawing Sheets

OTHER PUBLICATIONS

Bender, C. et al., "Asymptomaic Expansion of Integrals"; *Advanced Mathematical Methods for Scientists and Engineers*; 1978; McGraw–Hill, New York; pp. 247–316.

Brady, Patrick R. et al.; *Computing the merger of black–hole binaries; The IBBH problem*; 1998; The American Physical Society; vol. 58; pp. 1–5.

Anderson, S. B.; *A study of recycled pulsars in globular clusters*; 1993; Ph.D. thesis, California Inst. of Tech., Pasadena; pp. 1–98.

Apostolatos T. A.; *Search templates for gravitational waves from precessing, inspiraling binaries*; Phys. Rev.D; Jul. 15, 1995; The American Physical Society; vol. 52, No. 2; pp. 605–620.

Bailey, D. et al., *The Fractional Fourier Transform and Applications*; SIAM Review; Sep. 1991; Society for Industrial and Applied Mathematics; vol. 33, No. 3; pp. 389–404.

Carmona, R. et al.; *Practical Time–Frequency Analysis*; 1998; Academic Press, San Diego; pp. 269–308.

Damour; T. et al.; *Frequency–domain P–approximant filters for time–truncated inspiral gravitational wave signals from compact binaries*; May 10, 2000; pp. 1–50.

Damour, T. et al.; *Improved filters for gravitational waves from inspiraling compact binaries*; Jan. 15, 1998; The American Physical Society; vol. 57, No. 2; pp. 885–907.

Droz, S. et al.; *Gravitational waves from inspiraling compact binaries: Validity of the stationary–phase approximation to the Fourier transform*; May 18, 1999; The American Physical Society; vol. 59, pp. 1–8.

Finn, L. et al.; *Observing binary inspiral in gravitational radiation: One interferometer*; Mar. 15, 1993; The American Physical Society; vol. 47, No. 6, pp. 2198–2219.

Hankins, T. H. et al., *Pulsar Signal Processing*; pp. 55–129.

Helstrom C., *Statistical Theory of Signal Detection*; 1968; Pergamon Press, Oxford; pp. 290–336.

Jaynes, E. T.; *Bayesian Spectrum and Chirp Analysis*; 1987; Reidel Publishing Co., 1987, pp. 1–37.

Jenet, F. A. et al.; *A Wide–Bandwidth Digital Recording System for Radio Pulsar Astronomy*; June 1997; Astronomical Society of the Pacific; vol. 109; pp. 707–718.

Kay, S. M.; *Fundamentals of Statistical Signal Processing vol. II Detection Theory*; 1998 Prentice Hall PTR, New Jersey; pp. 248–301.

Lim, J. S., et al.; *Advanced Topics in Signal Processing*; 1988; Prentice–Hall International, Inc: Englewood Cliffs, New Jersey; pp. 289–337.

Mohanty, S.D.; *Heirarchichal search strategy for the detection of gravitational waves from coalescing binaries: Extension to post–Newtonian waveforms*; Jan. 15, 1998; The American Physical Society; vol. 57, No. 2; pp. 630–658.

Tanaka, T. et al.; *The use of new coordinates for the template space in hierarchical search for gravitational waves from inspiraling binaries*; Jan. 27, 2000; pp. 1–8.

Mohanty, S.D. et al.; *Hierarchical search strategy for the detection of gravitational waves from coalescing binaries*; Dec. 15, 1996; The American Physical Society; vol. 54, No. 12; pp. 7108–7128.

Owen, B. J. et al.; *Matched filtering of gravitational waves from inspiraling compact binaries: Computational cost and template placement*; Jun. 22, 1999; The American Physical Society; vol. 60; pp. 1–12.

Owen; B.J.; *Search templates for gravitational waves from inspiraling binaries: Choice of template spacing*; Jun. 15, 1996; The American Physical Society; vol. 53, No. 12; pp. 6749–6761.

Schutz, B.F.; *Data processing, analysis, and storage for interferometric antennas*; 1991; Cambridge University Press: Cambridge; pp. 406–453.

Smith, S.; *Algorithm to search for gravitational radiation from coalescing binaries*; Nov. 15, 1987; The American Physical Society; vol. 36, No. 10; pp. 2901–2904.

Hawking, S.W. et al.; *Three hundred years of gravitation*; Philosophiæ Naturalis Principia Mathematica; Cambridge University Press: Cambridge; pp. 331–458.

Van Trees, H.L.; *Detection, Estimation, and Modulation Theory, Part I*; 1968; Massachusetts Institute of Technology; John Wiley & Sons, Inc.:New York; pp. 246–366.

Van Trees, H.L.; *Detection, Estimation, and Modulation Theory, Part III Radar–Sonar Signal Processing and Gaussian Signals in Noise*; Massachusetts Institute of Technology; 1971, John Wiley & Sons, Inc.:New York; pp. 238–276.

Williams, P.R., et al.; *An Efficient Matched Filtering Algorithm for the Detection of Continuous Gravitational Wave Signals*; 2000; American Institute of Physics; pp. 473–476.

* cited by examiner

FAST CHIRP TRANSFORM

CROSS REFERENCE TO RELATED APPLICATION(S)

This application claims the benefit of U.S. Provisional Application No. 60/175,769 filed on Jan. 12, 2000, which is hereby incorporated by reference as if set forth in full herein.

STATEMENT REGARDING FEDERALLY SPONSORED RESEARCH OR DEVELOPMENT

The U.S. Government has certain rights in this invention pursuant to grant No. PHY9210038 awarded by the National Science Foundation.

COMPUTER PROGRAM LISTING APPENDIX

The present specification includes two (2) CD-ROMs containing computer source code which are referred to herein as Appendix A and Appendix B. The CD-ROMs are duplicates of each other and include the computer source files "class_chirp_xform.C" that is 8 Kilobytes in size, "fct_sample.C" that is 2 Kilobytes in size, "chirp_xform.h" that is 2 Kilobytes in size, and "LALfct.c" which is 32 kilobytes in size. The contents of the CD-ROMs are hereby incorporated by reference as if set forth in full herein.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates generally to digital signal processing and more particularly to digital signal processing of quasi-periodic signals whose frequency varies in time.

One application of digital signal processing is the detection and analysis of natural events. Typically, instruments may be used to detect energy released during a natural event. For example, a telescope may be used to gather fluctuating light signals from a star and the fluctuations of light levels may be analyzed to detect small changes in the star's position caused by an orbiting body. The light levels are transformed into electrical signals by a transducer and these electrical signals are digitized. These digitized signals typically contain a large amount of noise created by the transmission, detection, and transformation of the light levels originating with the star. Digital signal processing methods are typically used enhance the signal to noise ratio so that the actual signals may be detected and analyzed.

Another example of a natural event whose detection and analysis may be greatly enhanced by the use of digital signal processing is the combining of massive bodies such as two neutron stars in a binary system as depicted in FIGS. 1 and 2. The two stars, 10 and 12, orbit each other by their mutual gravitational attraction creating a binary system. The stars are have a significant amount of kinetic energy and angular momentum within the binary system. If the stars are close enough, the motion of the orbiting stars creates a gravitational wave 18 radiating outwards from the binary system. The loss of energy by the stars in the form of gravitational waves causes the stars to spiral in toward each other. As the gravitational wave propagates outward, it causes a gravitational strain that is detectable as an apparent change 22 in the distance 20 between two objects. The gravitational wave may be detected using a Michelson type laser interferometer 26 stationed at the Earth 24. The laser interferometer detects the gravitational wave by measuring the distance between test and reference masses using an interference pattern created by a split, reflected, and recombined laser beam.

FIG. 2 is a graphical depiction of the expected gravitational strain created by an inspiral binary star system versus time. The y axis 28 of the graph represents gravitational strain, h, which is the amplitude of the fractional "stretching" that occurs when a gravitational wave passes. That is, if h were 0.01, there would be a 1% change in the measured distance between two objects along one of the axes transverse to the direction of propagation of the gravitational wave. The actual stretching is small, a maximum of 1 part in 10^18 for most expected astrophysical events. The x axis 30 of the graph represents increasing time.

In the initial inspiral stage, the two binary stars, 10 and 12, approach and spiral towards each other at a greater and greater angular velocity. During the inspiral period, the generated gravitational waves are expected to result in changes in gravitational strain 32 with increasing amplitude and frequency, creating a "chirp" signal. Chirp signals are characterized as signals whose frequency changes in time. During the ringdown phase, the merged stars 15 are expected to create gravitational waves that cause changes in the gravitational strain characterized by a damped chirp signal where both the frequency and amplitude of the signal may decrease with time. During the merger phase 13, the inspiralling binary system is expected to generate gravitational waves of currently unknown amplitude and frequency.

Gravitational wave data may be analyzed by preparing templates of expected signal forms and comparing these templates to actual signals using Fourier transforms. For each expected signal, a new template must be created. This means that thousands of templates must be created for each expected type of inspiral event. The creation and use of numerous templates may require extensive computational resources. Therefore, a need exists for a digital signal processing method that does not require extensive template creation and storage. The present invention meets such need.

SUMMARY OF THE INVENTION

The present invention provides a digital signal processing technique, a Fast Chirp Transform (FCT), for the enhanced detection and production of quasi-periodic signals. In one embodiment, an quasi-periodic signal is detected in a signal sample by providing a phase function describing a phase term of an expected quasi-periodic signal. A set of contiguous intervals is determined wherein the difference in the phase function between the contiguous intervals is less than or equal to $\pi$ and the difference is substantially constant. A vector of phase coefficients is generated using the phase function with each element of the vector corresponding to a contiguous interval from the set of contiguous intervals. A signal sample is acquired and a dot product between the vector and the signal sample is calculated. The Fourier spectrum resulting from a Fast Fourier Transform on the dot product provides superior signal to noise ratios for detection of the expected quasi-periodic signals.

In one embodiment, a FCT is used to enhance the detection capabilities of a laser interferometer used to detect gravitational waves. In another embodiment, an FCT is used to enhance the detection of radar signals coming from a radar signal transmitter. In another embodiment, an FCT is used to detect a quasi-periodic reflected signal for object detection applications such as radar, sonar, and materials testing. In other embodiments, the inverse of the FCT is used to produce quasi-periodic signals.

BRIEF DESCRIPTION OF THE DRAWINGS

These and other features, aspects, and advantages of the present invention will become better understood with regard to the following description, appended claims, and accompanying drawings where:

APPENDIX A is a C++ implementation of a 2-Dimensional embodiment of the current invention; and APPENDIX B is a C implementation of a N-Dimensional embodiment of the current invention.

DETAILED DESCRIPTION OF THE INVENTION

The Fast Chirp Transform (FCT) is a generalization of the Fast Fourier Transform (FFT) algorithm which extends the range of usefulness of the FFT to input series with time-varying frequency evolution. A signal can be thought of as a set of values of some quantity, $h_j$, as a function of time. The FFT is an algorithm that transforms the set of values in the time domain into a set of complex amplitudes, $H_k$, in the frequency domain:

$$H_k = \sum_{j=0}^{N-1} h_j \exp[i 2\pi j k / N]$$

The complex amplitude, $H_k$, gives the real amplitude and phase of any component of the signal having frequency labeled by the subscript, k. The FFT thus decomposes a given signal into its frequency components, each of which is strictly periodic, with phase evolution that is linear in the time variable, j.

Figure 1:
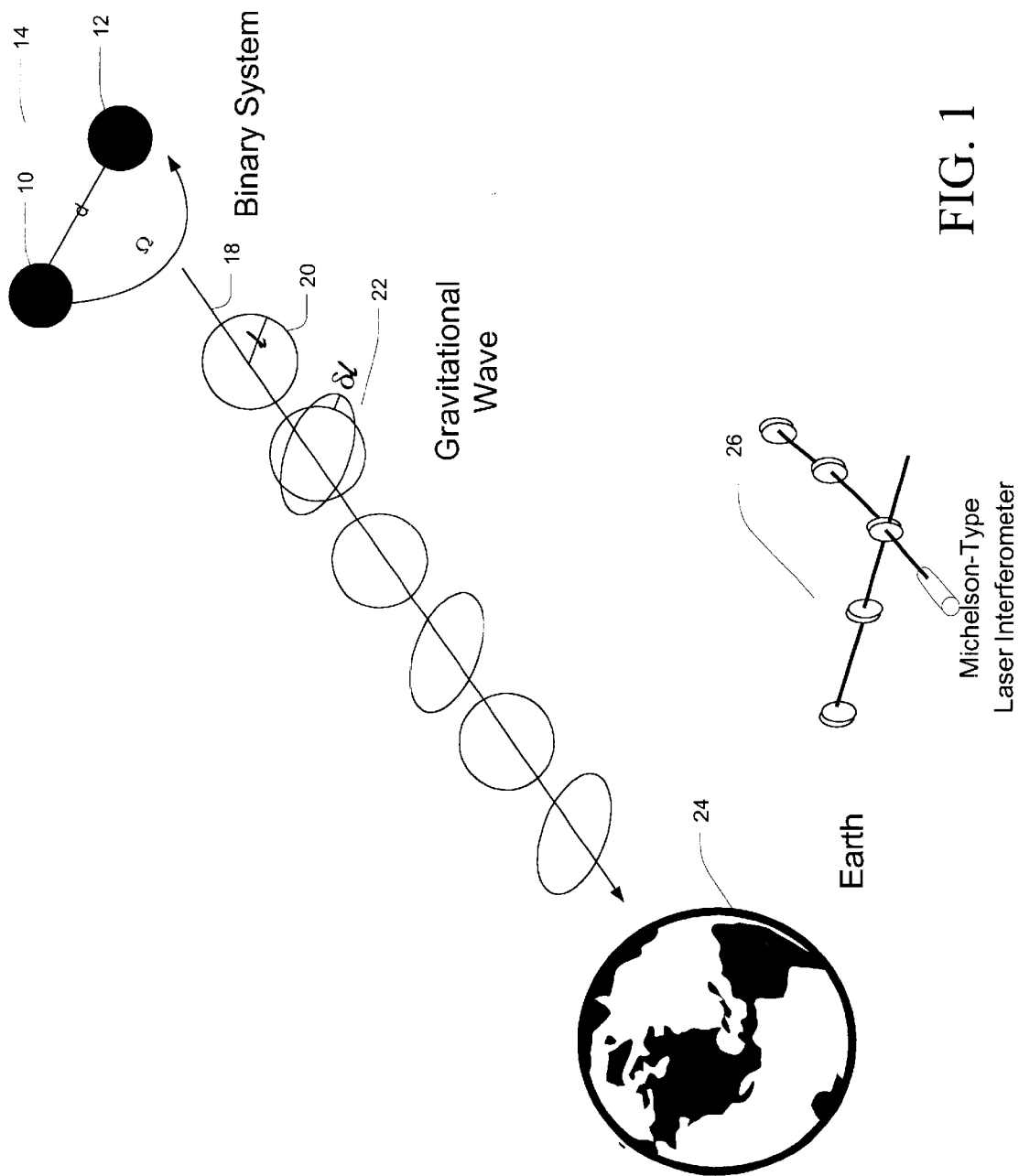
FIG. 1 is a diagram of an inspiral binary star system generating gravitational waves.
Figure 2:
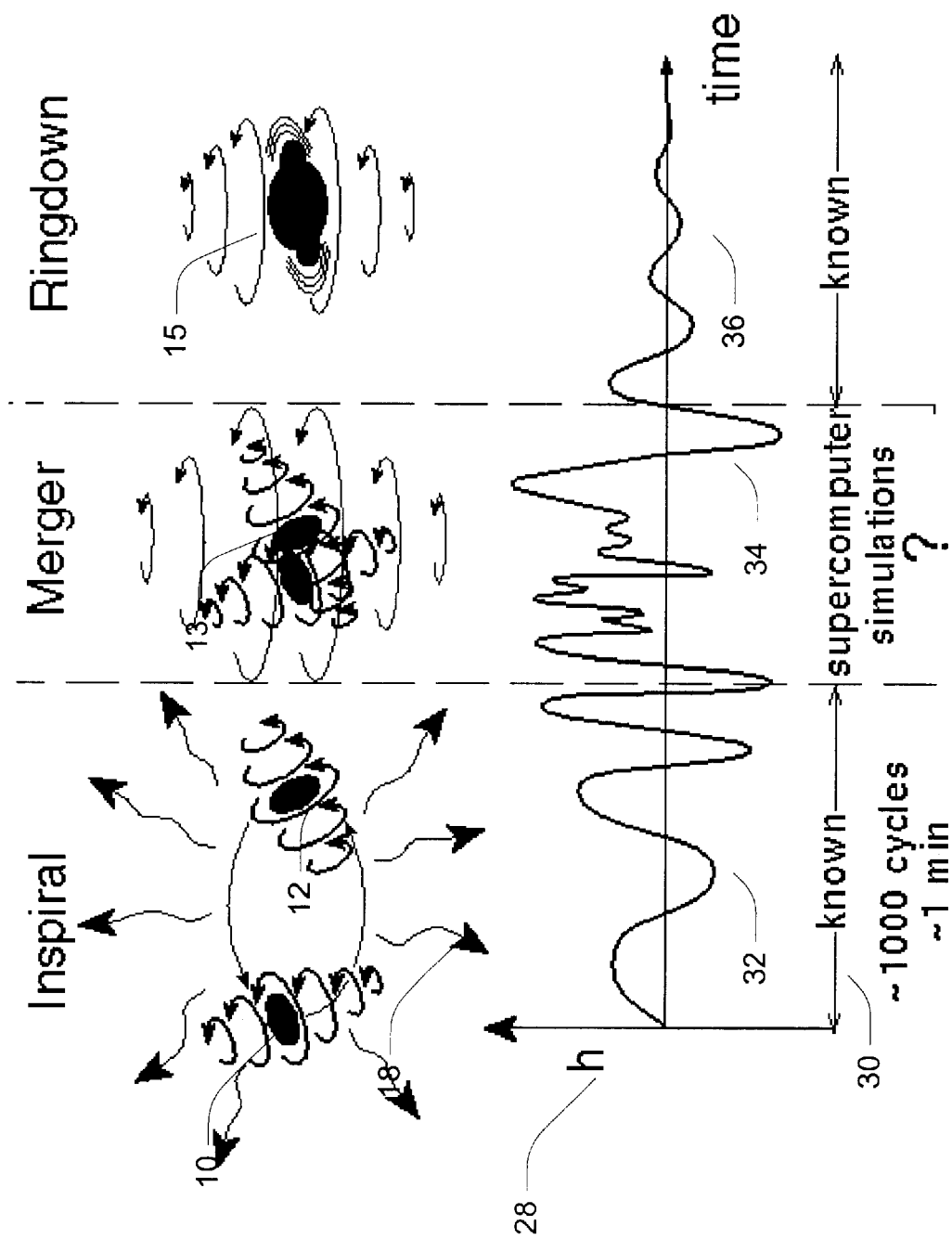
FIG. 2 is a diagram depicting the expected gravitational strain generated by an inspiral binary star system when two stars merge.
Figure 3:
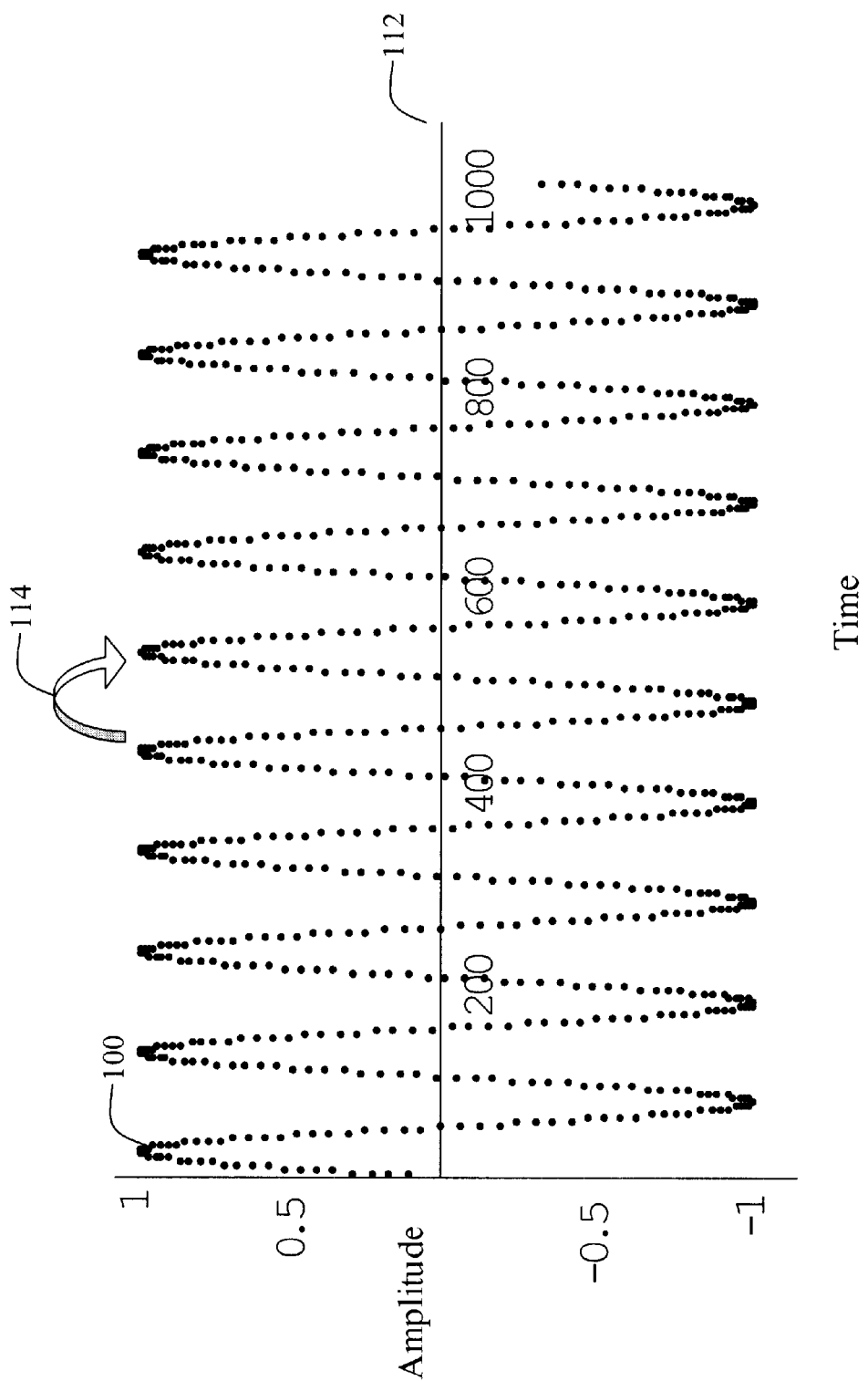
FIG. 3 is a graphical representation of a periodic input signal.

FIG. 3 is a graphical representation of a periodic input signal in the time domain. The Y axis 100 of the graph represents the amplitude of the periodic signal and the X axis 112 represents time. The period 114 between subsequent peaks in the signal is constant with time thus the frequency is constant with respect to time as well.

Figure 4:
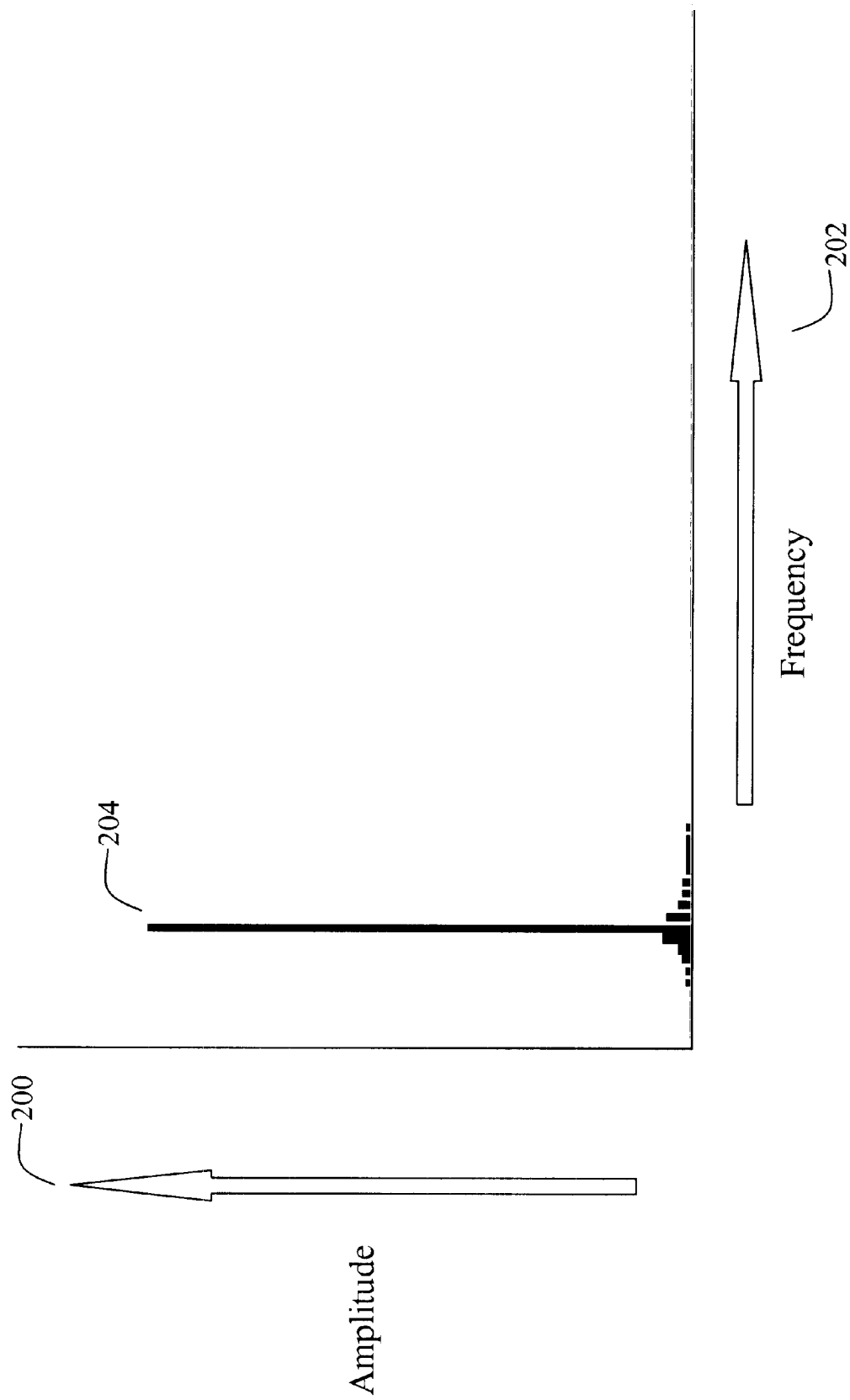
FIG. 4 is a graphical representation of the Fourier transform spectrum of the signal shown in FIG. 3.

FIG. 4 is a graphical representation of the periodic signal of FIG. 3 in the frequency domain generated by a FFT. The Y axis 200 represents the amplitude of the Fourier spectrum of the periodic signal and the X axis represents the frequency of the signal. For a periodic signal, the FFT concentrates the signal power into a few bins 204 in the frequency spectrum. Thus the FFT is well-suited for the detection of periodic signals. The FFT can be thought of as analyzing a signal by "matched filtering" for periodic signals.

Periodic signals are widespread in many applications. However, there are also important classes of signals that have variable frequency. Signals for which the frequency is monotonically increasing or decreasing with time are called "chirp" signals.

Figure 5:
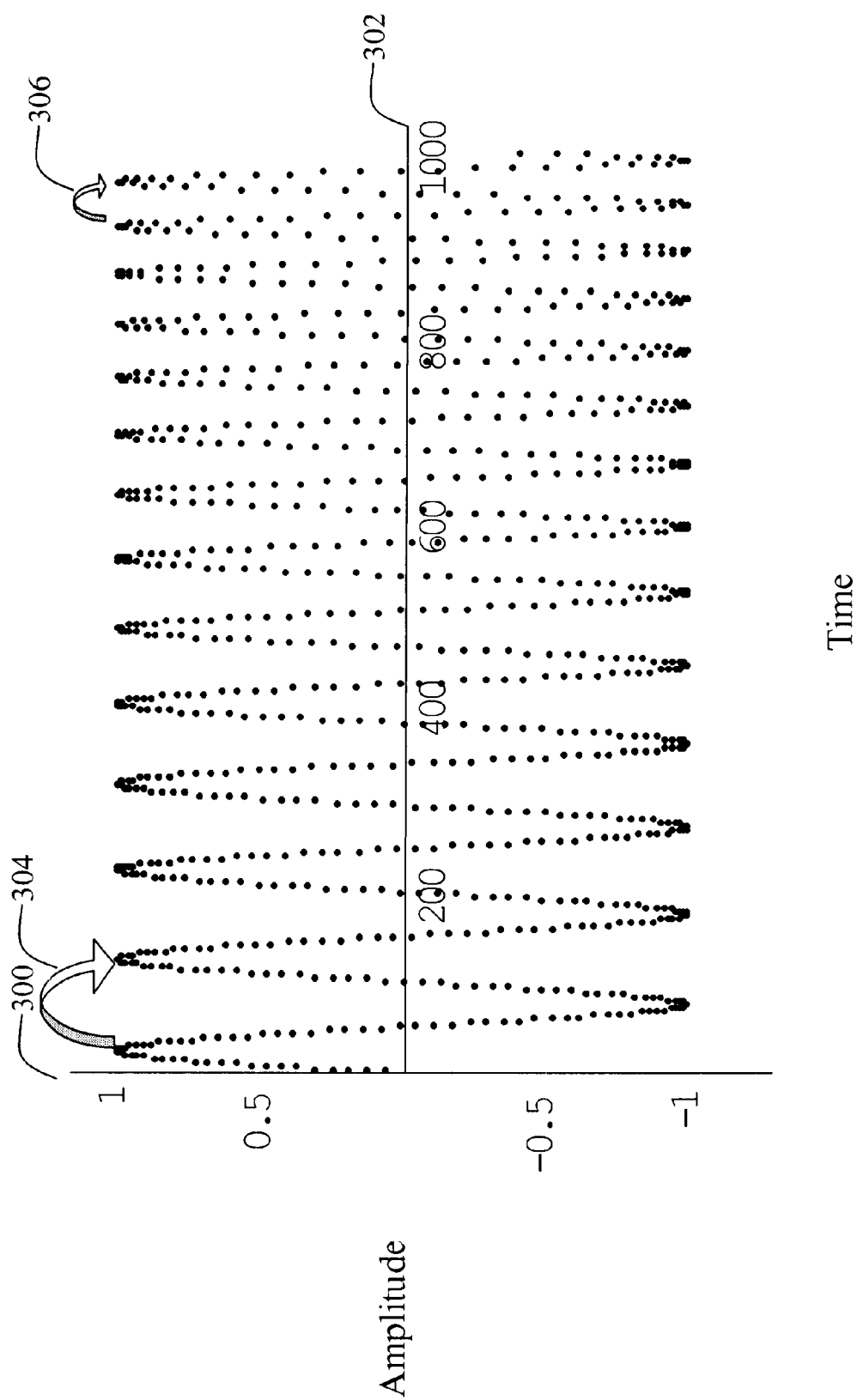
FIG. 5 is a graphical representation of a quasi-periodic "chirp" signal with increasing frequency.

FIG. 5 is a graphical representation of a quasi-periodic "chirp" signal with increasing frequency in the time domain. The Y axis 300 is the amplitude of the quasi-periodic signal and the X axis 302 represents time increasing to the left. The period of the quasi-periodic signal at the beginning of the graph 304 is about twice the period of the quasi-periodic signal at the end of the graph 306. Thus, the signal frequency increases by about a factor of two between the start and the end of the time series.

Figure 6:
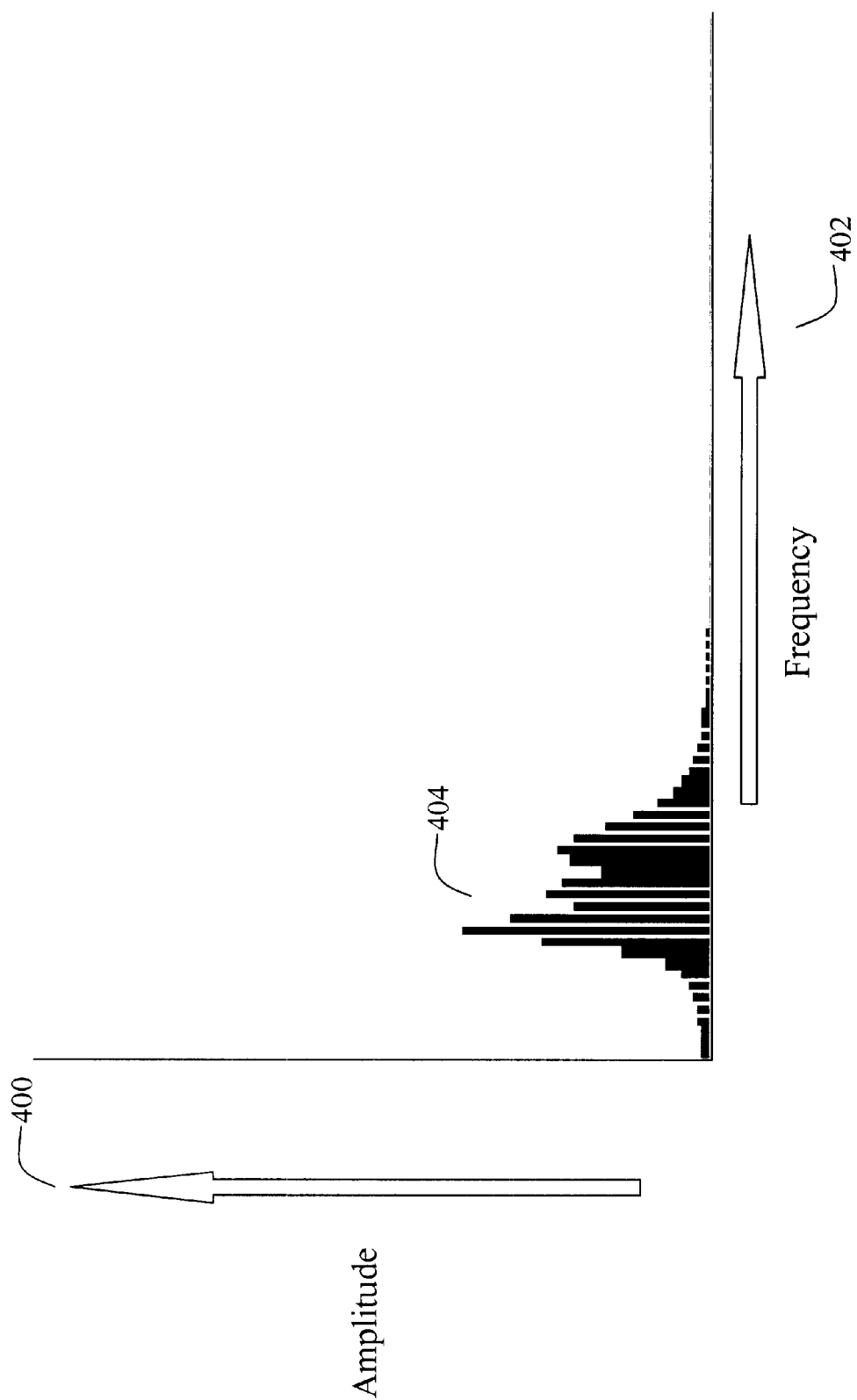
FIG. 6 is a graphical representation of the Fourier transform of the quasi-periodic signal of FIG. 5.

FIG. 6 is a FFT of the quasi-periodic signal of FIG. 5. The amplitude of the Fourier spectrum of the quasi-periodic signal is represented on the Y axis 400 and the frequency of the quasi-periodic signal is represented on the X axis 402. In this case the FFT spreads the power of the quasi-periodic signal over many bins. Thus, detection is made difficult because the signal-to-noise ratio is greatly reduced for any single bin in the frequency spectrum.

The FCT is an algorithm which extends the signal detection ability of the Fourier Transform to signals with time-varying frequency, such as chirp signals. The FCT restores the signal-detection capabilities for quasi-periodic signals by constructing a spectrum that concentrates the power in a few bins of the spectrum. As an example, some typical chirp signals can be characterized by frequency and rate of change of frequency. For signals with a constant rate of change of frequency, the spectrum generated by the FCT is 2-dimensional.

Figure 7:
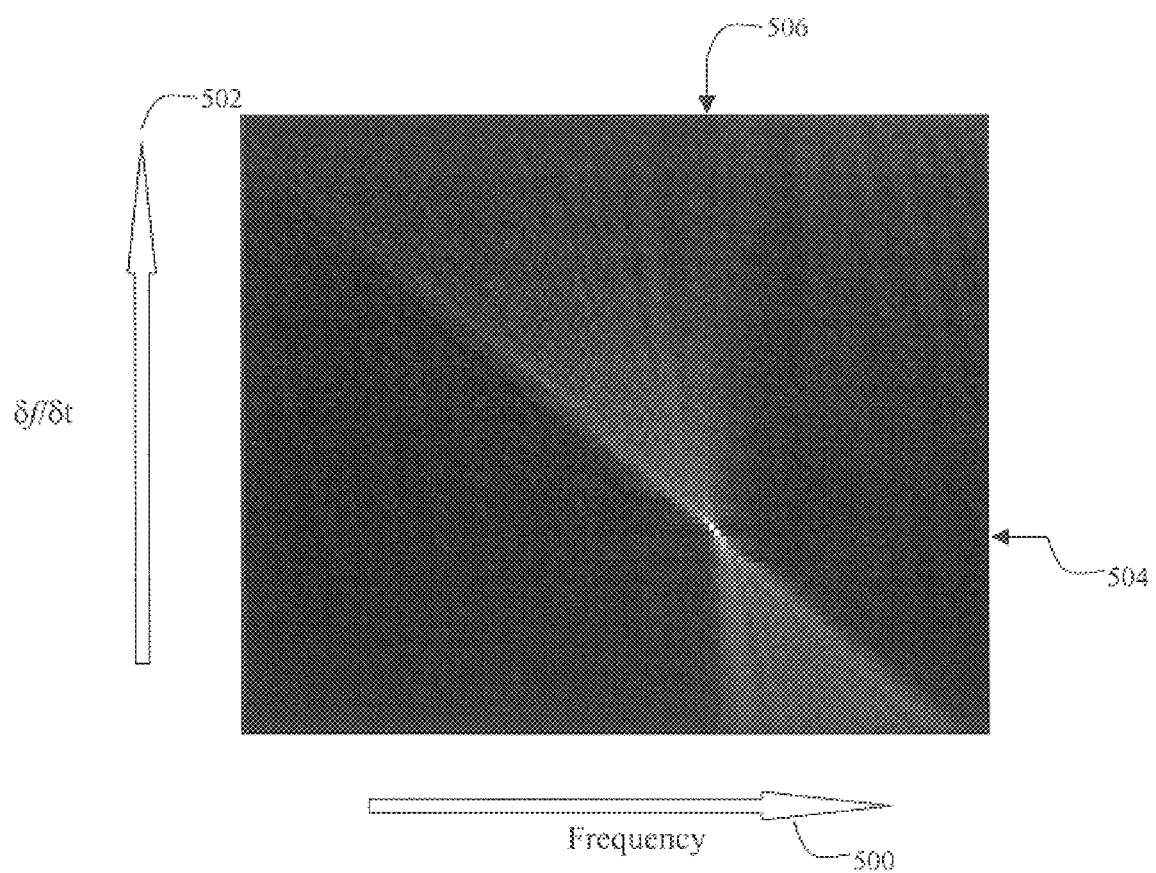
FIG. 7 is a graphical representation of a 2 dimensional Fast Chirp Transform of the quasi-periodic signal of FIG. 5.

FIG. 7 is a graphical representation of a 2 dimensional Fast Chirp Transform of the quasi-periodic signal of FIG. 5. The frequency derivative is plotted on the Y axis 502 and the frequency is plotted on the X axis 500. The brightness of the graph at a specific frequency/frequency-derivative point represents the amplitude of the quasi-periodic signal of FIG. 5. The signal power is restored to a single bin in the frequency/frequency-derivative plane. This can be clearly seen by re-plotting the graph at a constant δf/δt as shown in FIG. 8.

Figure 8:
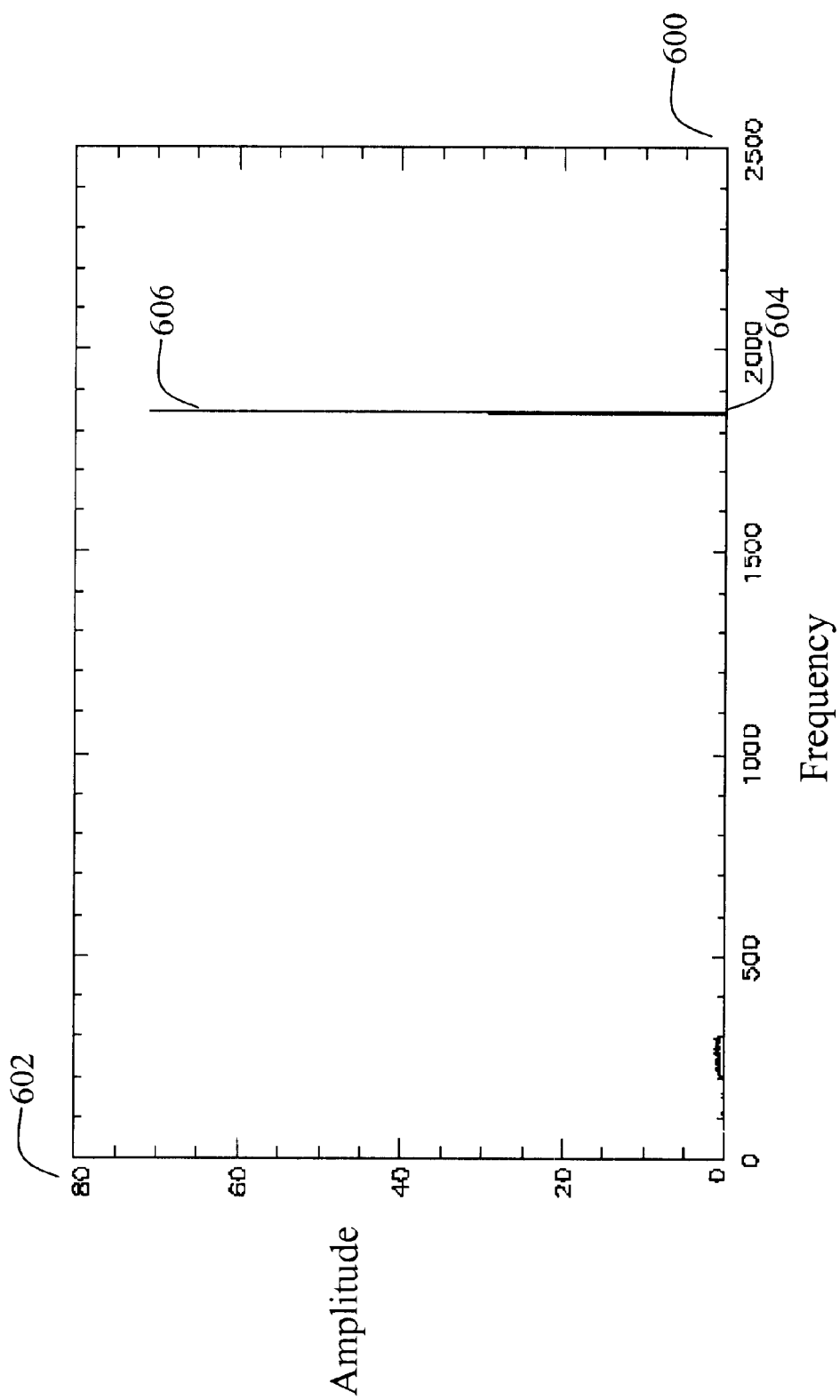
FIG. 8 is a graphical representation of a slice through one dimension of the graphical representation of FIG. 7.

FIG. 8 is a graphical representation of a frequency cross section through one dimension of the graphical representation of FIG. 7. The amplitude of the quasi-periodic signal is plotted against the Y axis 602 and the frequency of the quasi-periodic signal is plotted against the X axis 600 at a constant δf/δt 504 (FIG. 7). This is the frequency-derivative corresponding to the maximum FCT amplitude. The peak in amplitude 606 corresponds to the bright spot of FIG. 7 at a specific frequency 604.

The equation describing the Discrete Chirp Transform is analogous to the equation given above describing the Discrete Fourier Transform. The equation describing the Discrete Chirp Transform is:

$$C_{(\kappa_0,\ldots,\kappa_Q)} = \sum_{j=0}^{N_0-1} h_j \exp[i2\pi j \kappa_0 / N_0] \exp\left[i2\pi \sum_{m=1}^{Q} \kappa_m J_m(j)/N_m\right]$$

Note that the first part of the right-hand side is very similar to a standard Discrete Fourier Transform. However, the chirp transform contains additional terms which alter the phases that multiply the data samples, $h_j$.

In the case of the quadratic chirp, the Discrete Chirp Transform analogous to the Discrete Fourier Transform can be written as:

$$H_{k_0,k_1} = \sum_{j_0=0}^{N_0-1} h_{j_0} \exp[i2\pi(k_0(j_0/N_0) + k_1(j_0/N_0)^2)]$$

$$\cong \sum_{j_1=0}^{N_1-1} \exp[i2\pi(k_1(j_1/N_1))] \sum_{j_0=j_0^{\min}(j_1)}^{j_0^{\max}(j_1)} h_{j_0} \exp[i2\pi(k_0(j_0/N_0))]$$

Where both $k_0$ and $k_1$ are integers. The two expressions on the right-hand side are formally similar. In the second of the two expressions, the sum is broken into a set of contiguous, variable-length intervals and the quadratic phase term is replaced with a linear evolution in a second sampling variable, $j_1$. The FCT is an algorithm for defining the length of the intervals. The intervals are chosen as follows: for the largest $k_1$ of interest for the specific application, the intervals are chosen such that the phase term $2\pi k_1(j_0/N_0)^2$ changes by a substantially constant amount $\Delta \leq \pi$ as $j_1 \to j_1+1$. The qualifier "substantially" indicates that the condition is approximate because of the integer nature of the quantities involved. In actual implementation, one chooses those interval boundaries that substantially satisfy the phase-change condition. An implicit condition is that the signal, $h_{j_0}$, be sufficiently well sampled that neither the linear, nor the quadratic contribution to the phase term changes by more than $\pi$ from sample to sample.

Note in particular that the second expression on the right-hand side in the equation above contains only linear terms, and that all sums can be evaluated as short FFTs. The non-linearities have been absorbed into the specification of the length of the intervals. Because the expression only involves FFTs, we may write the expression as a 2-Dimensional FFT:

$$H_{k_0,k_1} \cong \sum_{j_1=0}^{N_1-1} \sum_{j_0=0}^{N_0-1} \hat{h}_{j_0,j_1} \exp[i2\pi(k_0(j_0/N_0))] \exp[i2\pi(k_1(j_1/N_1))]$$

where $\hat{h}_{j_0,j_1}$ is just equal to $h_{j_0}$ when $j_0^{min}(j_1) \leq j_0 < j_0^{max}(j_1)$ and zero otherwise, i.e. $\hat{h}_{j_0,j_1}$ is a sparse function.

The FCT is generalized in a straightforward way to apply to generalized phase evolution represented by a Discrete Chirp Transform of the form:

$$H_{(\kappa_0,\ldots,\kappa_Q)} \cong \sum_{j=0}^{N_0-1} h_j \exp\left[i2\pi\left(j\kappa_0/N_0 + \sum_{m=1}^{Q} \kappa_m \phi_m(j)/\phi_m(N_0)\right)\right]$$

where the $\phi_m(j)$ are a set of parameterless, non-linear phase functions. The resulting expression for the FCT can be formulated as a Q+1 dimensional FFT.

The Fast Chirp Transform (FCT) algorithm has several levels of implementation. The most generic implementation casts the FCT as an N-dimensional FFT of a sparse N-dimensional function. Because the function to be evaluated via the N-dimensional FFT is sparse, efficiencies of computation can be realized in several different ways.

An example of an FCT implementation which is very flexible and reasonably efficient evaluates the FFT in the N−1 non-linear phase dimensions by inspection to yield a vector of phase coefficients that are used in a dot product with the input data vector. The phase coefficient changes at each of the interval boundaries. The resulting equation is the one given in the introduction:

$$C_{(\kappa_0,\ldots,\kappa_Q)} = \sum_{j=0}^{N_0-1} h_j \exp\left[i2\pi \sum_{m=1}^{Q} \kappa_m J_m(j)/N_m\right] \exp[i2\pi j\kappa_0/N_0]$$

The dot product between the input data, $h_j$, and the phase coefficient:

$$\exp\left[i2\pi \sum_{m=1}^{Q} \kappa_m J_m(j)/N_m\right]$$

requires $O(N_0)$ operations to calculate, while the FFT over the index j requires $O(N_0 \log N_0)$ operations. The phase functions, $J_m(j)$, are the values of the linearized auxiliary sampling variables appropriate for each value of j, i.e. they are the index of the interval of the $m^{th}$ phase function corresponding to the $j^{th}$ sample.

Figure 9:
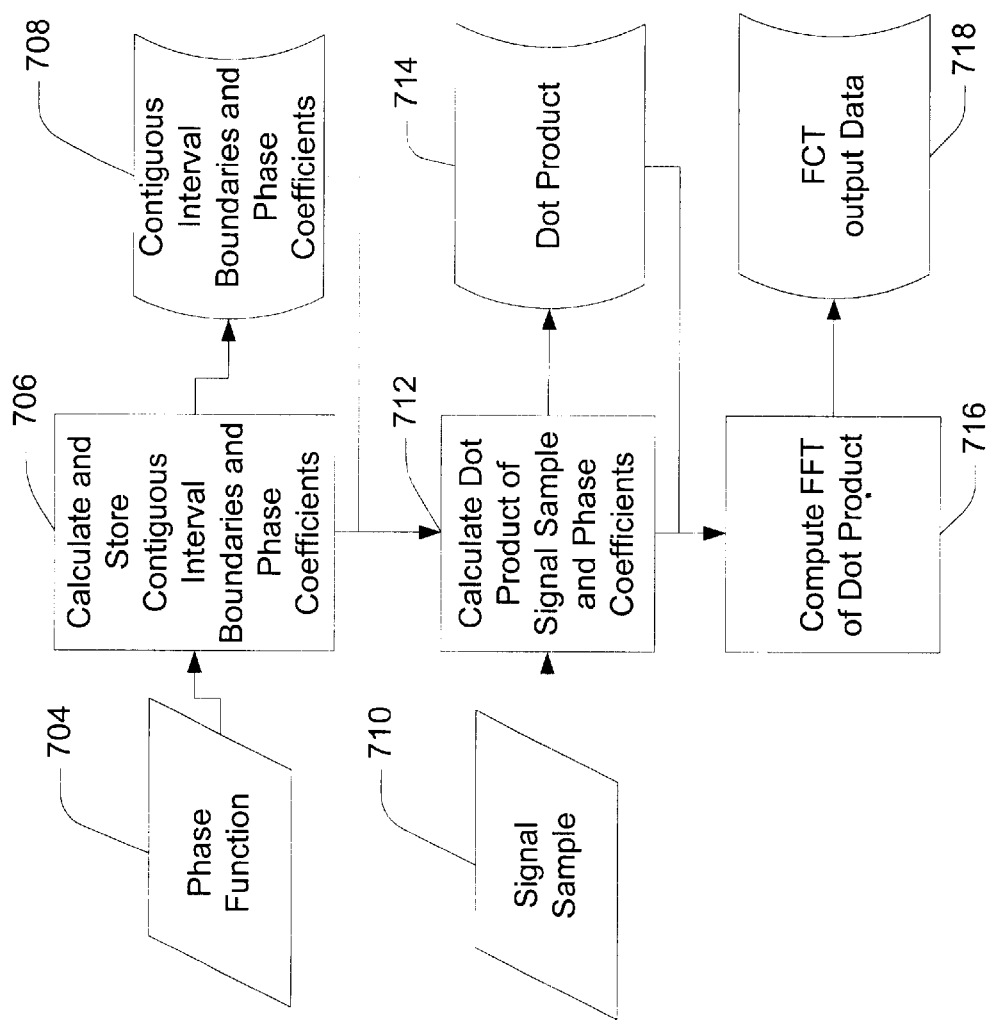
FIG. 9 is a process flow diagram of the calculation of a Fast Chirp Transform.

FIG. 9 is a process flow diagram of an algorithmic embodiment of the calculation of a Fast Chirp Transform. The previously described phase coefficients for the previously described boundary intervals 708 are calculated 706 using input phase functions 704. The time series input data representing the quasi-periodic signal is read 710 and the dot product 714 of the input data and the phase coefficients is calculated 712. Then the FFT of the dot product is computed 716 resulting in the final FCT output data 718.

Appendix A contains source code for a C++ implementation of a 2-dimensional version of the algorithm described in FIG. 9. Appendix B contains source code for a more general C++ implementation of a N-dimensional version of the algorithm described in FIG. 9.

Figure 10:
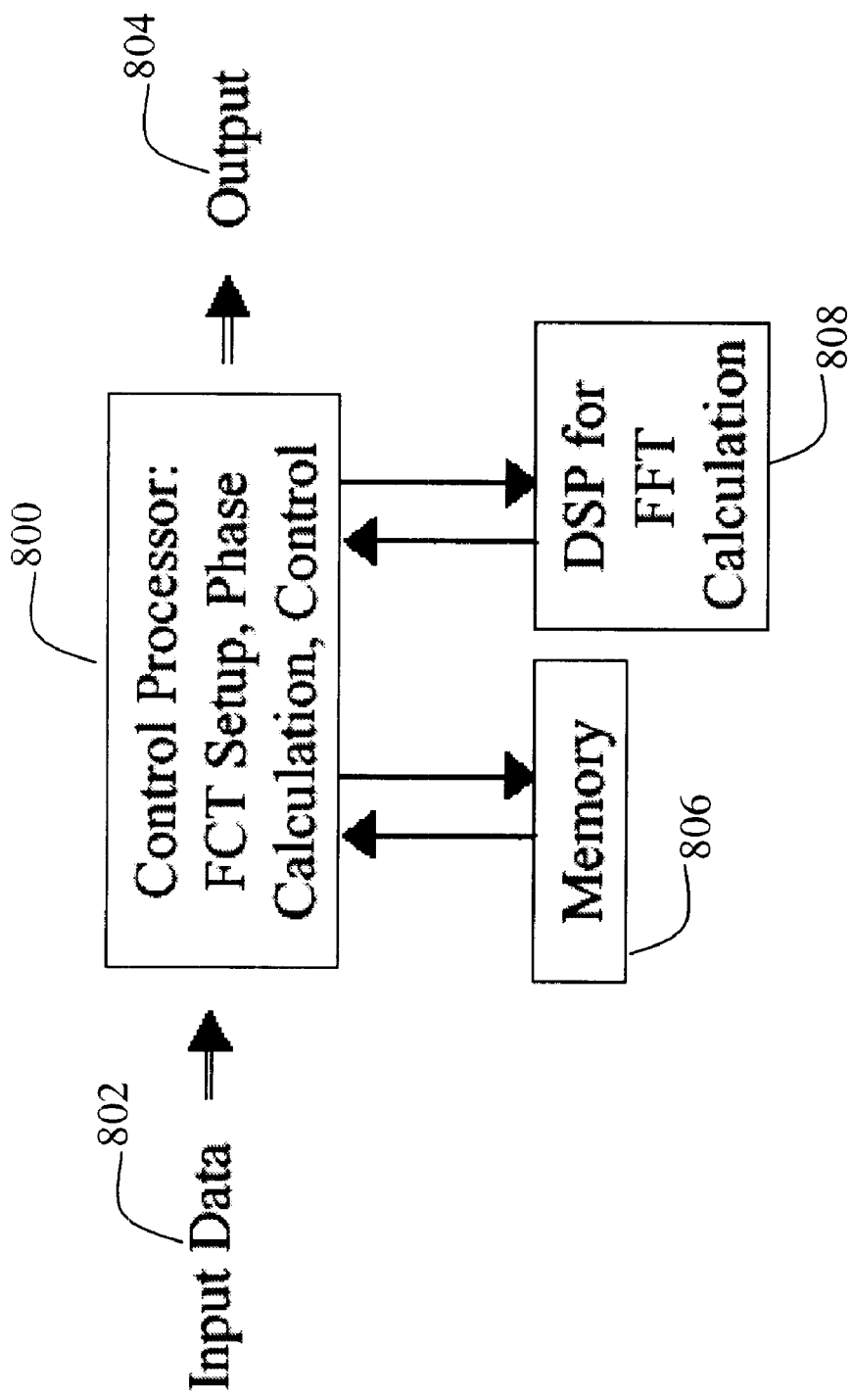
FIG. 10 is a depiction of the architecture of a digital signal processing system for calculating a Fast Chirp Transform.

FIG. 10 is a depiction of the architecture of a Digital Signal Processing (DSP) system for calculating a Fast Chirp Transform. A control processor 800 is operably coupled to a memory 806 and a FFT DSP 808. Processor instructions implementing the algorithm of FIG. 9 are stored at a first location in the memory. The previously described phase functions are stored at a second location within the memory.

The processor uses the stored phase functions and processor instructions to calculate the phase coefficients for the interval boundaries as previously described and stores the resultant phase coefficients as a multidimensional array at a third location in the memory. The processor then accepts input data 802 and calculates a dot product of the stored phase coefficients and input data. The dot product is stored as a multidimensional array in a fourth location in the memory. The processor transfers the dot product to the FFT DSP and the FFT DSP calculates a FFT using the dot product as the input data. The FFT data is then returned to the processor and presented as output data 804.

A similar DSP system can be implemented to calculate the inverse FCT of a set of, input data for the generation of chirp signals. In this case, the input data would be a FCT in the frequency domain and the output would be a data stream of the time series of a quasi-periodic signal. The data stream may then be used to drive a digital to analog converter to create a quasi-periodic signal.

The FCT is useful for the following broad classes of signal processing applications: detection of signals where matched filtering with a variable-frequency wave form is advantageous (this is sometimes called "pulse compression"); detection of signals with time-varying frequency (in particular chirp signals) where good signal-to-noise ratio performance is desirable or essential; detection of signals with large dispersion; detection of signals with Doppler shifts; and detection of signals with complex frequency variation (other than linear swept frequency chirps).

The FCT provides the following capabilities and advantages: the ability to perform matched filtering of families of expected chirp signals without storing individual matched filters or templates; straightforward implementation as a DSP; the ability to perform matched filtering of very general chirp signals; and the ability to be used as a digital signal generator to generate complex chirp waveforms.

In some embodiments of applications of signal detection using a FCT, the source of the quasi-periodic signals is not controlled. For example, detection of the previously described inspiralling binary star system. While not controlled, the behavior of the inspiralling binary stars can be modeled and the phase terms of the expected gravitational waves can be predicted. In this case, the general characteristics of the phase terms of the expected quasi-periodic signals resulting from gravitational waves affecting a laser interferometer can be expressed in a series of phase functions. These phase functions can be used to generate the previously described phase coefficients for use in a FCT used to process signal samples taken from the laser interferometer.

Figure 11:
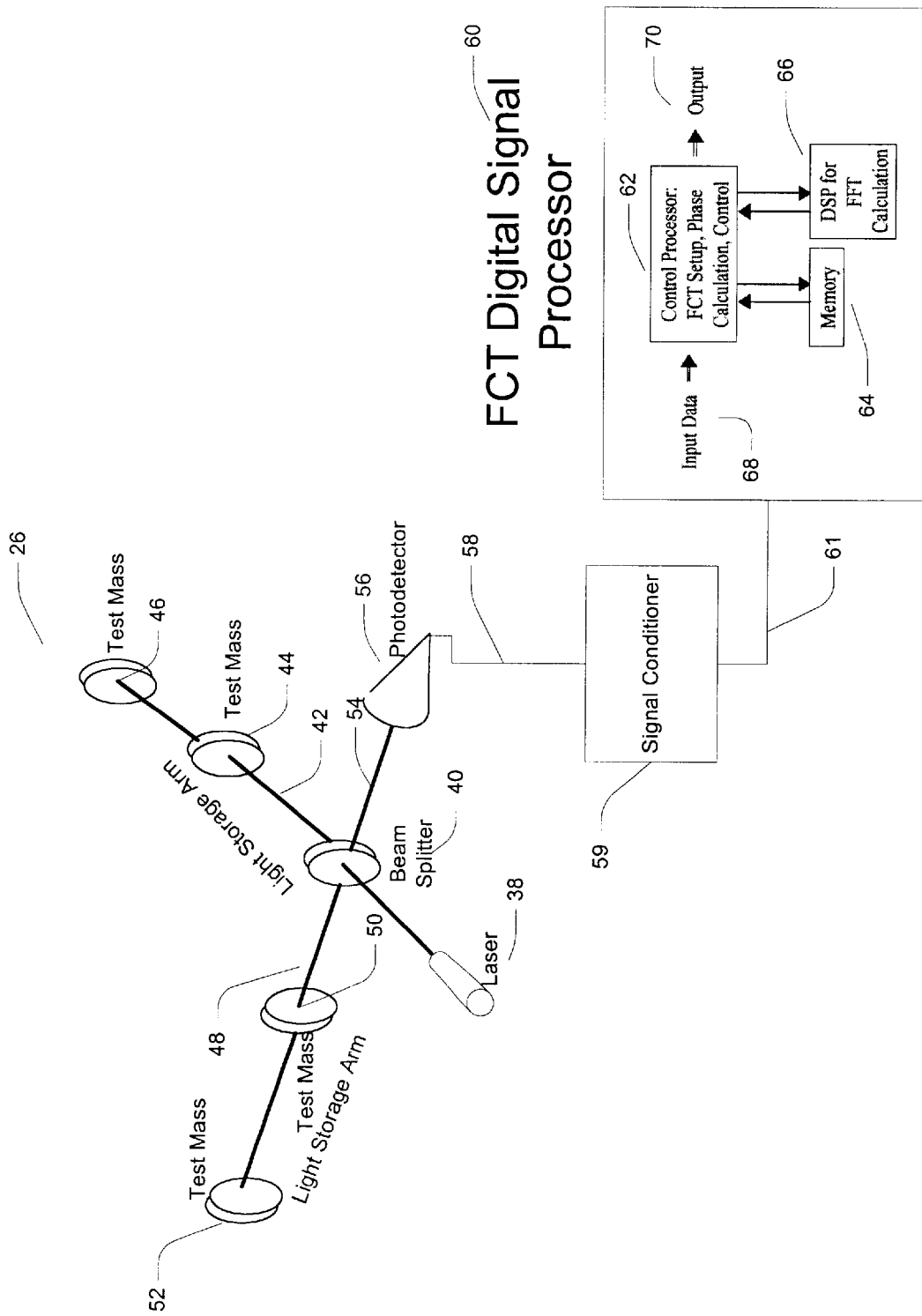
FIG. 11 is a depiction of a laser interferometer used to detect gravitational waves through the use of a Fast Chirp Transform processor.

An exemplary use of a FCT algorithm embodiment is shown in FIG. 11. A previously described laser interferometer 26 comprising a laser 38, a beam splitter 40, a first light storage arm 42, a second light storage arm 48 and a photodetector 56 is operably coupled to a signal conditioner 59 and a FCT digital signal processor 60. Alternatively, the FCT processor can be implemented as a computer program running on a general purpose microprocessor system.

At rest, the distance between the test masses within each light storage arm is such that a recombined laser beam the same and there is no change in the interference detected between the two reflected arms of the split laser beam travelling through a light storage arm. When a gravitational wave passes through the laser interferometer, the distance between test masses in the light storage arm transverse to the direction of propagation of the gravitational wave changes. The change in distance causes the distance one of the laser beams creating a corresponding change in the interference pattern detectable by the photodetector and output as an interference signal 58. The interference signal is fed into signal conditioner 59 where the fluctuations in the interference pattern are transformed into a gravitational strain signal 61 proportional to the gravitational strain created by the propagation of the gravitational wave.

The gravitational strain signal is digitized and used as input data 68 into the previously described FCT digital signal processor. The output data 70 is the FCT of the input gravitational strain signal.

Figure 12:
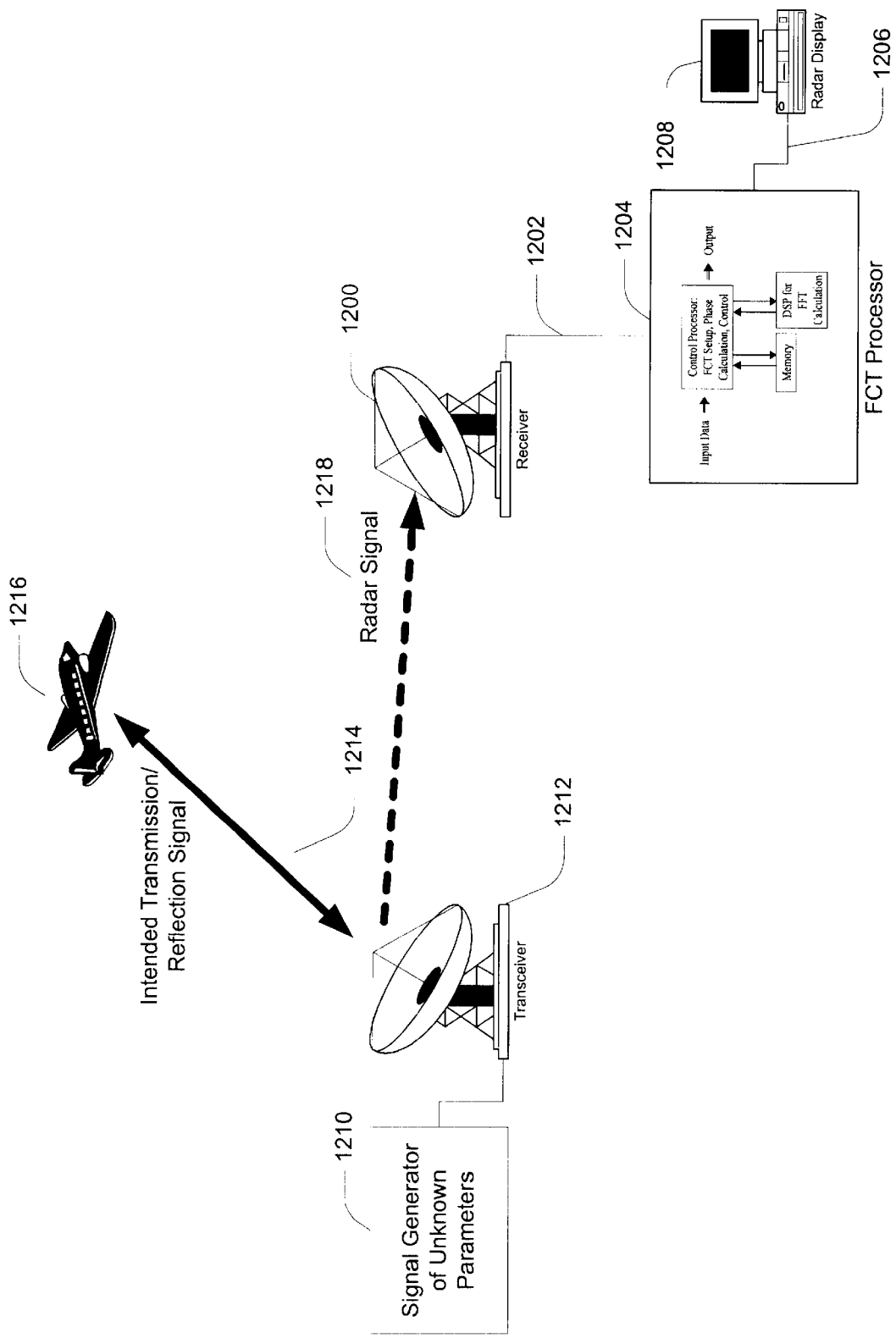
FIG. 12 is a depiction of using a Fast Chirp Transform processor in radar system.

Another exemplary use of a FCT algorithm embodiment to detect a quasi-periodic signal whose precise characteristics are not known is shown in FIG. 12. A non-cooperative radar transceiver 1212 and receiver 1200 are shown. The transceiver is operably coupled to a signal generator and amplifier 1210 that creates radar transmission signals 1214 with unknown frequency and amplitude characteristics. Radar signals may be generated that are quasi-periodic in nature so as to avoid detection by confusing a listening radar receiver expecting to detect a periodic radar signal using conventional matched filters. The quasi-periodic radar signals are transmitted at, and reflected from, an object such as an airplane 1216 for use by the transceiver to detect the airplane. The receiver, operably coupled to FCT processor 1204, receives a quasi-periodic radar signal 1218 and sends a radar signal sample to the FCT processor for processing. The FCT processor can then use various phase coefficient vectors generated from phase functions describing expected quasi-periodic radar signal to detect and analyze the radar signal sample. The use of the FCT enhances the ability to detect the quasi-periodic radar signal by enhancing the signal to noise ratio in the Fourier spectrum of the quasi-periodic signal as previously described, thus increasing the operational range of the receiver by allowing fainter quasi-periodic radar signals to be detected.

Alternatively, the receiver and FCT processor may be on an airplane or other platform for the purpose of detecting the quasi-periodic signals generated by the non-cooperative radar.

In other signal detection applications, a probe signal is generated with known characteristics by a signal generator and then transmitted with the intent to receive the signal's reflection off of an object by a reflected signal receiver. For example, ultrasonic signals are generated as probe signals and transmitted into a transmission medium such as concrete with the intention of receiving signal reflections from objects or flaws embedded in the concrete such as steel rods or voids created when the concrete did not flow properly. In these cases the signal may start out as a well defined periodic signal but may become distorted into a quasi-periodic signal through transmission through the medium or Doppler shifting caused by reflecting off of a moving object. Alternatively, the probe signal may be generated as a quasi-periodic signal because the quasi-periodic signal may have superior transmission or detection characteristics. In both cases, a FCT embodiment in the reflected signal receiver may enhance the signal to noise ratio in the reflected signal's Fourier spectrum. In the case where a quasi-periodic probe signal is useful, then an inverse FCT may be used to create a complex quasi-periodic probe signal.

In the radar example from above, an inverse FCT processor can be used to create quasi-periodic radar signals. The resultant quasi-periodic reflected radar signals can be received and transmitted to a FCT processor. In this manner, a wide variety of signal waveforms can be generated and detected using the FCT in addition to conventional linear swept frequency waveforms.

In another radar embodiment, a FCT processor system can be used to enhance the detection of Synthetic Aperture Radar (SAR) signals. SAR signals inherently involve chirps because of the motion of the SAR vehicle. SAR processing makes use of chirp matched filters. The FCT can be used to efficiently evaluate the chirp matched filters.

Figure 13:
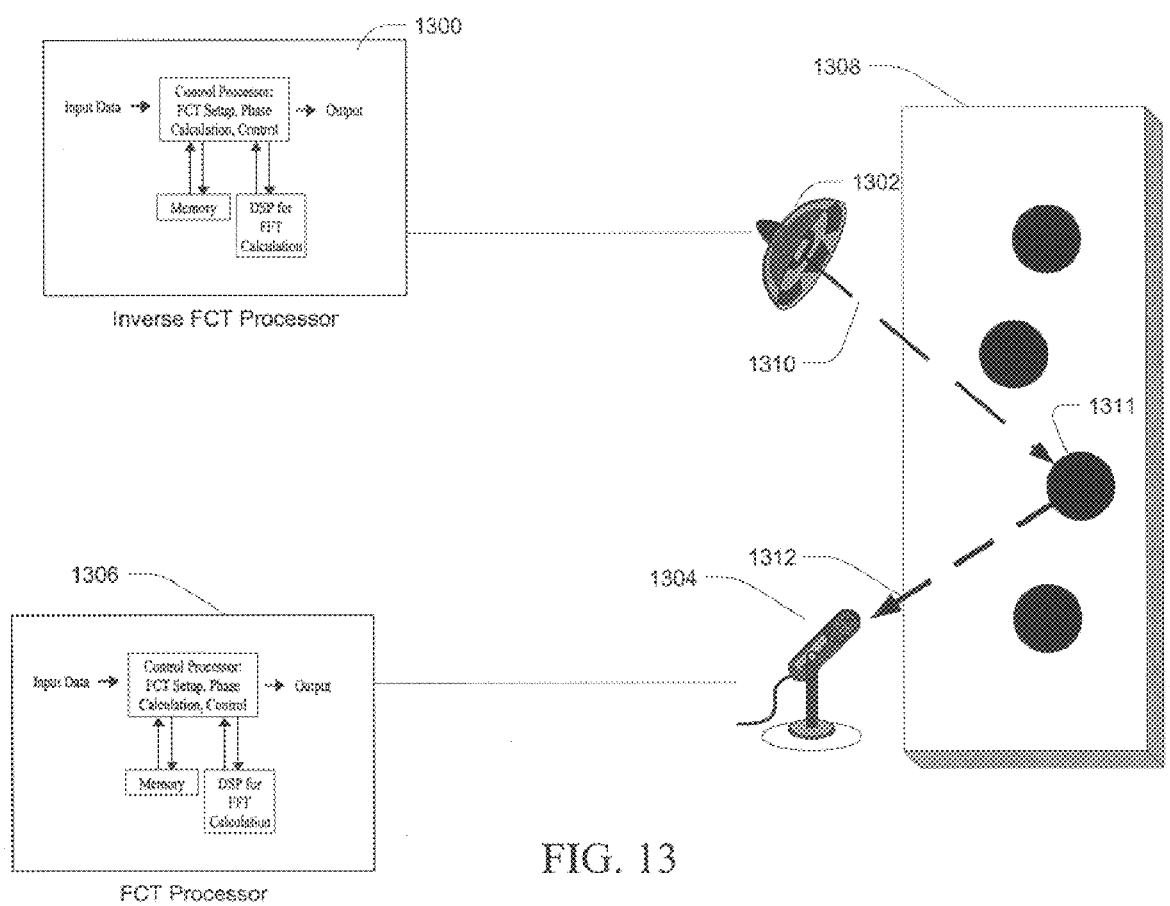
FIGS. 13 and 14 are diagrams of using a Fast Chirp Transform processor in an ultrasonic materials testing application.
Figure 14:
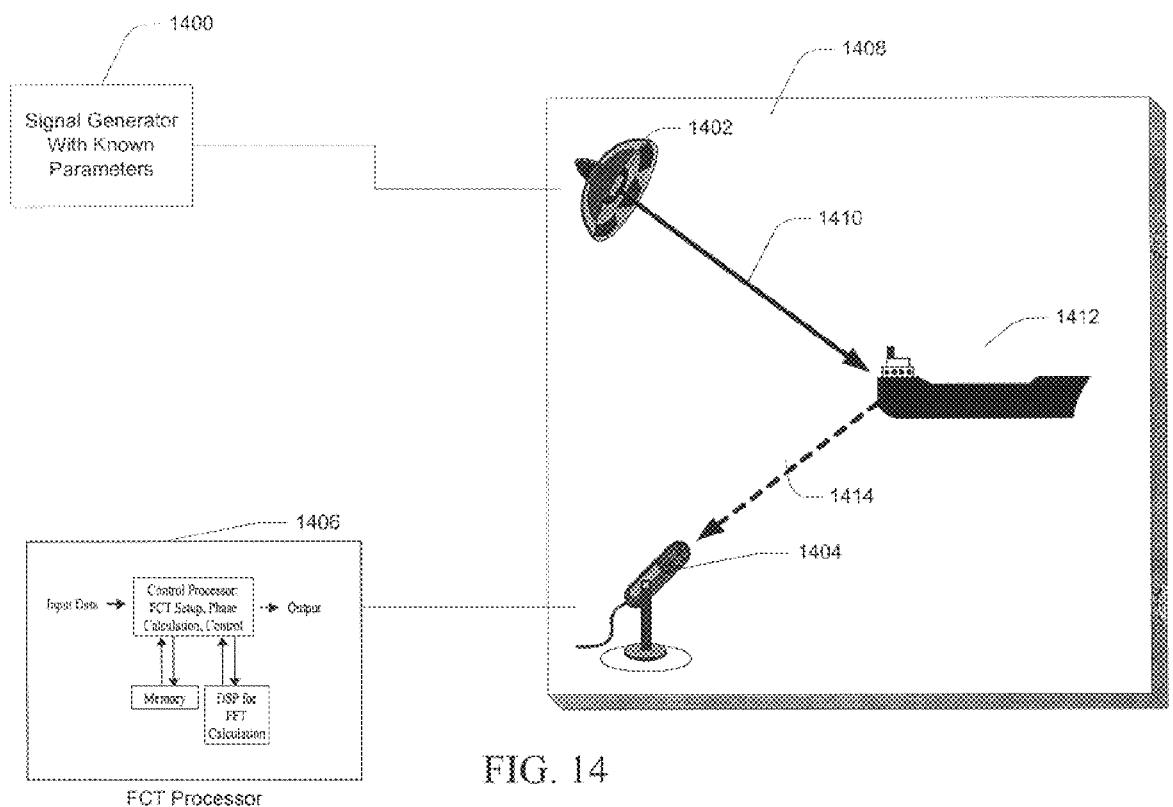

FIG. 13 is a diagram of using a Fast Chirp Transform processor in an ultrasonic materials testing embodiment. Ultrasound is used to detect structural flaws such as voids 1311 in a structure 1308 composed of a material such as metal or concrete. Ultrasonic signals 1310 are produced by a transducer 1302 and sound waves 1312 reflected from the structural flaws are detected by a microphone 1304 and recorded. The ultrasonic signals are often in the form of "chirp signals" in order to increase the time-bandwidth product of the transmitted signal. The reflected sound wave signals can show dispersion caused by the structure's material and therefore contain frequency shifts.

An inverse FFT processor 1300 can be used to create well characterized and complex chirp signals for transmission into the structure and a FCT processor 1306 can be used to perform pulse compression or matched filtering of the reflected signals thus enhancing the signal-to-noise ratio of the detection system.

In another ultrasonic embodiment, coded excitation of an ultrasonic signal used in medical imaging can be used to improve the signal-to-noise ratio and penetration depth of ultrasonic signals used to create ultrasound images, thereby lowering the required input energy. The FCT processor system can be used to perform matched filtering and pulse compression of the received ultrasonic signal.

In a related embodiment, FCT algorithms and inverse FCT algorithms can be used to enhance Sonar applications. Sonar signals show very significant dispersion and distortion caused by the transmission medium. The FCT can be used to increase the detection range for chirped or constant frequency sonar signals that undergo frequency distortion due to the medium in which the signal propagates. For instance, side-scan sonar often involves chirp matched filters using a Digital Signal Processor (DSP). The FCT can be used in a DSP implementation to perform efficient chirp matched filter processing.

In another embodiment of a FCT algorithm, the signal-to-noise performance and computational efficiency of a digital "chirp spread spectrum" (sometimes also referred to as "pulsed FM") communication system are optimized through the use of a FCT algorithm.

Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by any claims supportable by this application and the claims' equivalents rather than the foregoing description.

What is claimed is:

1. A method for detecting a quasi-periodic signal within a signal sample, comprising:
    providing a vector of phase coefficients;
    acquiring a signal sample;
    calculating a dot product between the vector and the signal sample; and
    performing a Fast Fourier Transform on the dot product.

2. The method of claim 1, further comprising:
    providing a phase function describing a phase term of a quasi-periodic signal;
    determining a set of contiguous intervals wherein the difference in the phase function between the contiguous intervals is less than or equal to $\pi$ and the difference is substantially constant;
    generating the vector of phase coefficients using the phase function, each phase coefficient corresponding to a contiguous interval from the set of contiguous intervals.

3. A method for detecting a quasi-periodic signal within a signal sample, comprising:
    providing a phase function describing a phase term of a quasi-periodic signal;
    determining a set of contiguous intervals wherein the difference in the phase function between the contiguous intervals is less than or equal to $\pi$ and the difference is substantially constant;
    generating a vector of phase coefficients using the phase function, each phase coefficient corresponding to a contiguous interval from the set of contiguous intervals;
    acquiring a signal sample;
    calculating a dot product between the vector and the signal sample; and
    performing a Fast Fourier Transform on the dot product.

4. A method of detecting a quasi-periodic gravitational wave, comprising:
    providing a laser interferometer, the laser interferometer for detecting gravitational strain created by a gravitational wave;
    providing a photodetector coupled to the laser interferometer;
    providing a phase function describing a phase term of the quasi-periodic gravitational wave;
    determining a set of contiguous intervals wherein the difference in the phase function between the contiguous intervals is less than or equal to $\pi$ and the difference is substantially constant;
    generating a vector of phase coefficients using the phase function, each phase coefficient corresponding to a contiguous interval from the set of contiguous intervals;
    acquiring a gravitational wave signal sample from the photodetector;
    calculating a dot product between the vector and the gravitational wave signal sample; and
    performing a Fast Fourier Transform on the dot product.

5. A method of detecting a quasi-periodic radar signal, comprising:
    providing a radar signal receiver;
    providing a phase function describing a phase term of a quasi-periodic radar signal;
    determining a set of contiguous intervals wherein the difference in the phase function between the contiguous intervals is less than or equal to $\pi$ and the difference is substantially constant;
    generating a vector of phase coefficients using the phase function, each phase coefficient corresponding to a contiguous interval from the set of contiguous intervals;
    acquiring a radar signal sample from the receiver;
    calculating a dot product between the vector and the radar signal sample; and
    performing a Fast Fourier Transform on the dot product.

6. A method for detecting a quasi-periodic reflected signal, comprising:
    generating a probe signal;
    acquiring a reflected signal sample of signals reflected from an object impinged by the probe signal;
    providing a phase function describing a phase term of an expected quasi-periodic reflected signal;
    determining a set of contiguous intervals wherein the difference in the phase function between the contiguous intervals is less than or equal to $\pi$ and the difference is substantially constant;

generating a vector of phase coefficients using the phase function, each phase coefficient corresponding to a contiguous interval from the set of contiguous intervals;

calculating a dot product between the vector and the reflected signal sample; and performing a Fast Fourier Transform on the dot product.

7. The method of claim 6 wherein the probe signal is generated using an inverse FCT.

8. The method of claim 6 wherein the probe signal is an acoustic signal.

9. The method of claim 6 wherein the probe signal is a radar signal.

10. A digital signal processing system for detecting a quasi-periodic signal within a signal sample, comprising:
- a processor; and
- a memory coupled to the processor and having program instructions stored therein for execution by the processor, the program instructions including:
  - providing a vector of phase coefficients;
  - acquiring a signal sample;
  - calculating a dot product between the vector and the signal sample; and
  - performing a Fast Fourier Transform on the dot product.

11. The digital signal processing system of claim 10, the program instructions further including:
- a phase function describing a phase term of an expected quasi-periodic signal;
- determining a set of contiguous intervals wherein the difference in the phase function between the contiguous intervals is less than or equal to $\pi$ and the difference is substantially constant; and
- generating the vector of phase coefficients using the phase function, each phase coefficient corresponding to a contiguous interval from the set of contiguous intervals.

12. A digital signal processing system for detecting a quasi-periodic signal within a signal sample, comprising:
- a processor; and
- a memory coupled to the processor and having program instructions stored therein for execution by the processor, the program instructions including:
  - a phase function describing a phase term of an expected quasi-periodic signal;
  - a determining a set of contiguous intervals wherein the difference in the phase function between the contiguous intervals is less than or equal to $\pi$ and the difference is substantially constant;
  - generating a vector of phase coefficients using the phase function, each phase coefficient corresponding to a contiguous interval from the set of contiguous intervals;
  - acquiring a signal sample;
  - calculating a dot product between the vector and the signal sample; and
  - performing a Fast Fourier Transform on the dot product.

13. An apparatus to detect a quasi-periodic signal within a signal sample, comprising:
- means for acquiring a signal sample;
- means for calculating a dot product between a vector of phase coefficients and the signal sample; and
- means for performing a Fast Fourier Transform on the dot product.

14. The apparatus of claim 13, further comprising:
- means for defining a phase function describing a phase term of an expected quasi-periodic signal;
- means for determining a set of contiguous intervals wherein the difference in the phase function between the contiguous intervals is less than or equal to $\pi$ and the difference is substantially constant; and
- means for generating the vector of phase coefficients using the phase function, each phase coefficient corresponding to a contiguous interval from the set of contiguous intervals.

15. An apparatus for detecting a radar signal, comprising:
- a digital signal processing system for detection of a quasi-periodic signal within a signal sample, including:
  - a processor; and
  - a memory coupled to the processor and having program instructions stored therein for execution by the processor, the program instructions including:
    - a vector of phase coefficients;
    - calculating a dot product between the vector and the signal sample; and
    - performing a Fast Fourier Transform on the dot product; and
- a radar signal receiver coupled to the digital signal processing system.

16. The apparatus of claim 15, the digital signal processing system program instructions further including:
- a phase function describing a phase term of a quasi-periodic radar signal;
- determining a set of contiguous intervals wherein the difference in the phase function between the contiguous intervals is less than or equal to $\pi$ and the difference is substantially constant; and
- generating the vector of phase coefficients using the phase function, each phase coefficient corresponding to a contiguous interval from the set of contiguous intervals.

17. An apparatus for detecting a quasi-periodic reflected signal, comprising:
- a digital signal processing system for detection of a quasi-periodic reflected signal within a signal sample, including:
  - a processor; and
  - a memory coupled to the processor and having program instructions stored therein for execution by the processor, the program instructions including:
    - a vector of phase coefficients;
    - calculating a dot product between the vector and the signal sample; and
    - performing a Fast Fourier Transform on the dot product;
- a probe signal generator; and
- a reflected signal receiver coupled to the digital signal processing system.

18. The apparatus of claim 17, the digital signal processing system program instructions further including:
- a phase function describing a phase term of an expected quasi-periodic reflected signal;
- determining a set of contiguous intervals wherein the difference in the phase function between the contiguous intervals is less than or equal to $\pi$ and the difference is substantially constant; and generating the vector of phase coefficients using the phase function, each phase coefficient corresponding to a contiguous interval from the set of contiguous intervals.

19. The apparatus of claim 18 wherein the probe signal generator includes means for generating a probe signal using an inverse FCT.

20. The apparatus of claim 18 wherein the probe signal is an acoustic signal.

21. The apparatus of claim 18 wherein the probe signal is a radar signal.

* * * * *